United States Patent
Sun

(10) Patent No.: US 12,056,030 B2
(45) Date of Patent: Aug. 6, 2024

(54) METHOD AND SYSTEM FOR DETERMINING INTERVAL TIME FOR TESTING OF SERVER, AND DEVICE AND MEDIUM

(71) Applicant: INSPUR SUZHOU INTELLIGENT TECHNOLOGY CO., LTD., Jiangsu (CN)

(72) Inventor: Yongfei Sun, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/247,165

(22) PCT Filed: Jul. 30, 2021

(86) PCT No.: PCT/CN2021/109516
§ 371 (c)(1),
(2) Date: Mar. 29, 2023

(87) PCT Pub. No.: WO2022/088809
PCT Pub. Date: May 5, 2022

(65) Prior Publication Data
US 2023/0376397 A1    Nov. 23, 2023

(30) Foreign Application Priority Data
Oct. 29, 2020    (CN) .......................... 202011178475.1

(51) Int. Cl.
G06F 11/34    (2006.01)
G06F 11/22    (2006.01)
G06F 11/30    (2006.01)

(52) U.S. Cl.
CPC .......... *G06F 11/3055* (2013.01); *G06F 11/22* (2013.01); *G06F 11/3006* (2013.01); *G06F 11/3452* (2013.01)

(58) Field of Classification Search
CPC ...... G06F 11/22; G06F 11/26; G06F 11/2247; G06F 11/2289; G06F 11/3428; G06F 11/3452; G06F 11/3409
See application file for complete search history.

(56) References Cited

U.S. PATENT DOCUMENTS 10,671,520 B1 *    6/2020    Rodrigues ............... H04L 43/08
10,901,881 B1 *    1/2021    Kim ..................... G06F 11/3688
(Continued)

FOREIGN PATENT DOCUMENTS

CN    104980962 A    10/2015
CN    110445669 A    11/2019
(Continued)

OTHER PUBLICATIONS

International search report for PCT/CN2021/109516 mailed on Sep. 27, 2021.
(Continued)

*Primary Examiner* — Yolanda L Wilson
(74) *Attorney, Agent, or Firm* — Dennemeyer & Associates LLC; Victoria Friedman

(57) ABSTRACT

A method and a system for determining interval time for testing of a server, and a device and a storage medium are provided. The method includes: evenly dividing multiple servers into multiple groups of servers, and performing multiple rounds of testing on each group of servers; calculating performance values of each group of servers in each round of testing according to a weight corresponding to each influencing factor, and packaging and writing the performance values and interval time corresponding to the per-
(Continued)

formance values in a database; and collecting, at every other preset time, current values corresponding to influencing factors in an actual running process of a server, calculating a current performance value of the server based on the current values according to the weight corresponding to the respective one of the one or more influencing factors, and determining, from the database, interval time corresponding to the current performance value.

20 Claims, 2 Drawing Sheets

(56) References Cited

U.S. PATENT DOCUMENTS

| | | | |
|---|---|---|---|
| 2016/0147646 A1 | 5/2016 | Raghavan et al. | |
| 2020/0117565 A1* | 4/2020 | Ponnuvel | G06F 11/2284 |

FOREIGN PATENT DOCUMENTS

| | | | | |
|---|---|---|---|---|
| CN | 110780990 A | | 2/2020 | |
| CN | 111078478 A | * | 4/2020 | G06F 11/2273 |
| CN | 111338924 A | | 6/2020 | |
| CN | 112433908 A | | 3/2021 | |
| WO | WO-2015032282 A1 | * | 3/2015 | G06F 11/3024 |

OTHER PUBLICATIONS

Search report for Chinese application 202011178475.1, filed Oct. 29, 2020.

* cited by examiner

Fig. 3

| Acquisition module | Test module |
|---|---|
| Calculation module | Execution module |

Fig. 4

| Application instructions/modules corresponding to a method for determining interval time for testing of a server |
|---|

METHOD AND SYSTEM FOR DETERMINING INTERVAL TIME FOR TESTING OF SERVER, AND DEVICE AND MEDIUM

CROSS-REFERENCE TO RELATED APPLICATIONS

This is a 35 U.S.C. 371 National Stage Patent Application of International Application No. PCT/CN2021/109516, filed Jul. 30, 2021, which claims priority to Chinese application 202011178475.1, filed Oct. 29, 2020, each of which is hereby incorporated by reference in its entirety.

TECHNICAL FIELD

The present disclosure relates to the field of servers, and more particularly, to a method and a system for determining interval time for testing of a server, and a computer device and a readable medium.

BACKGROUND

In recent years, with the development of technologies, server operation and maintenance has become an essential part at a present stage. At present, during a research and development process or an operation and maintenance process, research and development personnel or operation and maintenance personnel are usually not aware of the criteria for setting interval time for testing a server state, and mostly set testing intervals according to their vague understandings about the testing intervals. Many problems will occur in this process. For example, in one aspect, a server may operate in a healthy state for a long time, and it is not necessary to poll the operation state of the server periodically, in such a case, interval time for testing set arbitrarily will result in waste of resources. In another aspect, if the set interval time for testing is relatively small, large pressure will be increased on the server with a large task execution amount and poor server performance. In addition, only one interval time for testing is uniformly set without differentiating the interval time for testing with respect to different servers, and a lot of meaningless testing is performed when the interval time for testing is set too small, which may reduce the operation efficiency and may ignore some issues on the servers.

SUMMARY

In view of the above, the embodiments of the present disclosure provide a method and a system for determining interval time for testing of a server, and a computer device and a computer-readable storage medium. Interval time for testing is dynamically adjusted based on current performance, which may avoid sending heartbeat requests at a high frequency, plan polling interval time reasonably, and improve the task execution efficiency.

An aspect of the embodiments of the present disclosure provides a method for determining interval time for testing of a server, which includes the following operations. Network data is acquired according to performance influencing key words for servers, the network data is analyzed to determine one or more influencing factors of the servers, and a weight corresponding to a respective one of the one or more influencing factors is determined. Multiple servers are evenly divided into multiple groups of servers, and multiple rounds of testing are performed on each group of servers, wherein different numbers of tasks are allocated to different groups of servers, and interval time of a respective round of the multiple rounds of testing is successively increased. Performance values of each group of servers in each round of testing are calculated according to the weight corresponding to the respective one of the one or more influencing factors, and the performance values and the interval time corresponding to the performance values are packaged and written in a database. One or more current values respectively corresponding to the one or more influencing factors are collected at every other preset time in an actual running process of a server, a current performance value of the server is calculated based on the one or more current values and the weight corresponding to the respective one of the one or more influencing factors, and interval time corresponding to the current performance value is determined from the database so as to test the server based on the determined interval time.

In some implementations, the operation that the performance values and the interval time corresponding to the performance values are packaged and written in the database includes that: an average performance value of each group of servers in each round of testing is calculated, and the average performance value and the performance values are packaged together.

In some implementations, the operation that the interval time corresponding to the current performance value is determined from the database includes that: whether there is a unique performance value that has a minimum absolute value of a difference value relative to the current performance value in the database is judged; and in response to that there is a unique performance value that has the minimum absolute value of the difference value relative to the current performance value in the database, the interval time corresponding to the unique performance value is set as the interval time corresponding to the current performance value.

In some implementations, the operation that the interval time corresponding to the current performance value is determined from the database includes that: in response to that there are at least two performance values that have the minimum absolute value of the difference value relative to the current performance value in the database, whether the at least two performance values correspond to the same interval time in the database is judged; and in response to that the at least two performance values correspond to the same interval time in the database, the interval time is set as the interval time corresponding to the current performance value.

In some implementations, the operation that the interval time corresponding to the current performance value is determined from the database includes that: in response to that the at least two performance values correspond to different interval time in the database, an average value of the different interval time corresponding to the at least two performance values is set as the interval time corresponding to the current performance value.

In some implementations, the operation that the interval time corresponding to the current performance value is determined from the database includes that: in response to that the at least two performance values correspond to different interval time in the database, the interval time corresponding to a lowest average performance value is set as the interval time corresponding to the current performance value.

In some implementations, the method may further include that the preset time is adjusted according to the interval time corresponding to the current performance value.

Another aspect of the embodiments of the present disclosure provides a system for determining interval time for testing of a server, which includes: an acquisition module, configured to acquire network data according to performance influencing key words for servers, analyze the network data to determine one or more influencing factors of the servers, and determine a weight corresponding to a respective one of the one or more influencing factors; a test module, configured to evenly divide multiple servers into multiple groups of servers, and perform multiple rounds of testing on each group of servers, wherein different numbers of tasks are allocated to different groups of servers, and interval time of a respective round of the multiple rounds of testing is successively increased; a calculation module, configured to calculate performance values of each group of servers in each round of testing according to the weight corresponding to the respective one of the one or more influencing factors, and package and write the performance values and the interval time corresponding to the performance values in a database; and an execution module, configured to collect, at every other preset time, the one or more current values respectively corresponding to the one or more influencing factors in an actual running process of a server, calculate a current performance value of the server based on the one or more current values and the weight corresponding to the respective one of the one or more influencing factors, and determine, from the database, interval time corresponding to the current performance value so as to test the server based on the determined interval time.

Still another aspect of the embodiments of the present disclosure provides a computer device, which includes at least one processor, and a memory. The memory stores computer instructions capable of running on the processor; and the instructions implement operations of the above method when being executed by the processor.

Yet another aspect of the embodiments of the present disclosure provides a computer-readable storage medium. The computer-readable storage medium stores a computer program that causes a processor to implement operations of the above method when being executed by the processor.

The embodiments of the present disclosure have the following beneficial technical effects: interval time for testing is dynamically adjusted based on current performance, which may avoid sending heartbeat requests at a high frequency, plan polling interval time reasonably, and improve the task execution efficiency.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings in the following description are only part of embodiments of the present disclosure, and other embodiments may also be obtained by those having ordinary skill in the art according to these drawings without any creative work.

FIG. 3 illustrates a schematic structural diagram of a system for determining interval time for testing of a server provided in some embodiments of the present disclosure.

FIG. 4 illustrates a schematic diagram of a computer-readable storage medium provided in some embodiments of the present disclosure.

DETAILED DESCRIPTION

In order to make the objectives, technical solutions, and advantages of the present disclosure clearer, the present disclosure will be further described in detail below with reference to the drawings and embodiments.

It is to be noted that all expressions using "first" and "second" in the embodiments of the present disclosure are for the purpose of distinguishing between two non-identical entities or non-identical parameters with the same name. It may be seen that "first" and "second" are only for the convenience of expression, and should not be construed as a limitation to the embodiments of the present disclosure. This applies to all the occurrences of the similar terms and therefore will not be repeated in subsequent embodiments.

Figure 1:
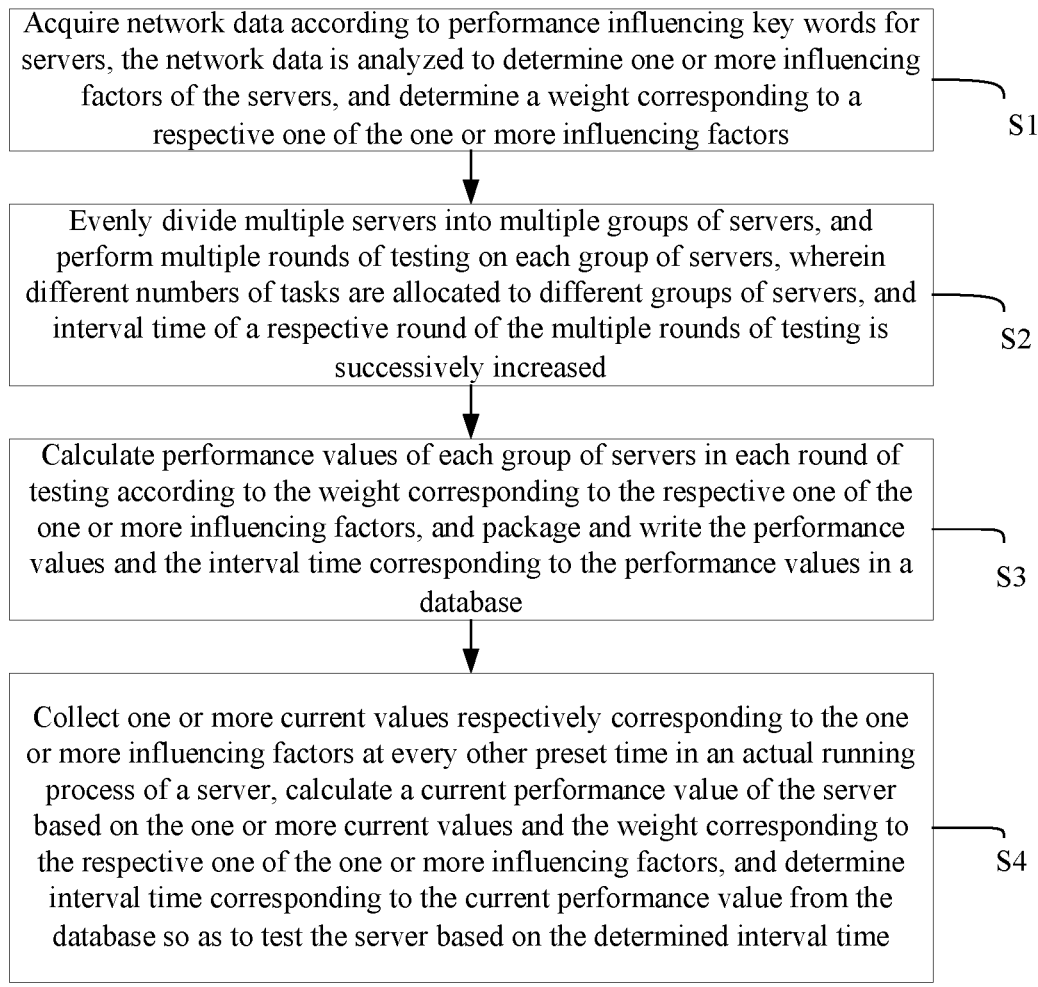
FIG. 1 illustrates a schematic diagram of a method for determining interval time for testing of a server provided in some embodiments of the present disclosure.

A first aspect of the embodiments of the present disclosure provides a method for determining interval time for testing of a server. FIG. 1 illustrates a schematic diagram of a method for determining interval time for testing of a server provided in some embodiments of the present disclosure. As shown in FIG. 1, the embodiment of the present disclosure includes the following operations S1 to S4.

At S1, network data is acquired according to performance influencing key words for servers, the network data is analyzed to determine one or more influencing factors of the servers, and a weight corresponding to a respective one of the one or more influencing factors is determined.

At S2, multiple servers are evenly divided into multiple groups of servers, and multiple rounds of testing are performed on each group of servers, wherein different numbers of tasks are allocated to different groups of servers, and interval time of a respective round of the multiple rounds of testing is successively increased.

At S3, performance values of each group of servers in each round of testing are calculated according to the weight corresponding to the respective one of the one or more influencing factors, and the performance values and the interval time corresponding to the performance values are packaged and written in a database.

At S4, one or more current values respectively corresponding to the one or more influencing factors are collected at every other preset time in an actual running process of a server, a current performance value of the server is calculated based on the one or more current values and the weight corresponding to the respective one of the one or more influencing factors, and interval time corresponding to the current performance value is determined from the database so as to test the server based on the determined interval time.

The network data is acquired according to the performance influencing key words of the servers, the network data is analyzed to determine the one or more influencing factors of the servers, and the weight corresponding to a respective one of the one or more influencing factors is determined. The network data is acquired by using a web crawler technology according to the performance influencing key words for servers. The data is integrated, and one or more key factors influencing the servers (for example, the utilization rate of a Central Processing Unit (CPU), the utilization rate of a memory, the number of services, and the rotating speed of a fan) are analyzed by using technologies such as big data analysis or data mining, and the proportions of all influencing factors are analyzed and calculated, for example, the proportion weight of the utilization rate of the CPU is $w_1$, the proportion weight of the utilization rate of the memory is $w_2$, and the proportion weight of the rotating speed of the fan is $w_3$.

Multiple servers are evenly divided into multiple groups of servers. Multiple rounds of testing are performed on each group of servers, wherein different numbers of tasks are allocated to different groups of servers, and interval time of a respective round of the multiple rounds of testing is successively increased. For example, n servers are selected, the servers are divided into multiple groups of servers $s_1$, $s_2$, $s_3$ ... $s_n$, and different groups of servers may be allocated with different task types. For example, a plurality of common server tasks $r_1$, $r_2$, $r_3$ ... $r_n$ existing in the market are collected, and the number of tasks contained in $r_1$ to $r_n$ increases gradually. A task distribution program is called to distribute different numbers of tasks to different groups of servers.

The performance values of each group of servers in each round of testing are calculated according to the weight corresponding to the respective one of the one or more influencing factors, and the performance values and the interval time corresponding to the performance values are packaged and written in the database. The performance values of each group of servers may be calculated according to the following formula:

$$f_{(x)} = x_1 * w_1 + x_2 * w_2 + \left(\frac{100}{x_f}\right) * \frac{x_{f1} + x_{f2} + \dots x_{fn}}{n} * w_3 \dots$$

Herein, $x_1$ represents the utilization rate of the CPU, $x_2$ represents the utilization rate of the memory, [$x_{f1}$, $x_{f2}$ ... ] represents the rotating speed of the fan, $w_1$ represents the proportion weight of the utilization rate of the CPU, $w_2$ represents the proportion weight of the utilization rate of the memory, and $w_3$ represents the proportion weight of the rotating speed of the fan. Test executing samples are distributed to the above tasks so that n rounds of testing are performed. The interval time of respective round of testing is set from t=1 to t=n.

In some implementations, the operation that the performance values and the interval time corresponding to the performance values are packaged and written in the database includes that: an average performance value of each group of servers in each round of testing is calculated, and the average performance value and the performance values are packaged together. After the performance values of each group of servers are calculated, the average performance value of each group of servers in this round of testing may be calculated, the average performance value is associated with the performance values of the corresponding group of servers, and then the average performance value and the performance values may be packaged together.

One or more values respectively corresponding to the one or more influencing factors are collected at every other preset time in an actual running process of a server, a current performance value of the server is calculated according to the weight corresponding to the respective one of the one or more influencing factors, and interval time corresponding to the current performance value is determined from the database.

In some implementations, the operation that the interval time corresponding to the current performance value is determined from the database includes that: whether there is a unique performance value that has a minimum absolute value of a difference value relative to the current performance value in the database is judged; and in response to that there is a unique performance value that has the minimum absolute value of the difference value relative to the current performance value in the database, the interval time corresponding to the unique performance value is set as the interval time corresponding to the current performance value. For example, the current performance value is 30, the performance value that has the minimum difference value relative to the current performance value in the database is 29, and the interval time corresponding to the unique performance value is 2 seconds, so the value indicative of 2 seconds may be set as the interval time corresponding to the current performance value.

In some implementations, the operation that the interval time corresponding to the current performance value is determined from the database includes that: in response to that there are at least two performance values that have the minimum absolute value of the difference value relative to the current performance value in the database, whether the at least two performance values correspond to the same interval time in the database is judged; and in response to that the at least two performance values correspond to the same interval time in the database, the interval time is set as the interval time corresponding to the current performance value. Continuing with the above example, the performance values that have the minimum difference values relative to the current performance value in the database are respectively 29(*a*), 29(*b*), and 31, and the interval time corresponding to 29(*a*), 29(*b*), and 31 are all 2 seconds, then the value indicative of 2 seconds is set as the interval time corresponding to the current performance value.

In some implementations, the operation that the interval time corresponding to the current performance value is determined from the database includes that: in response to that the at least two performance values correspond to different interval time in the database, an average value of the different interval time corresponding to the at least two performance values is set as the interval time corresponding to the current performance value. Continuing with the above example, if the interval time corresponding to 29(*a*) is 1 second, the interval time corresponding to 29(*b*) is 2 seconds, and the interval time corresponding to 31 is 3 seconds, then an average value (2 seconds) of the three interval time is determined as the interval time corresponding to the current performance value.

In some implementations, the operation that the interval time corresponding to the current performance value is determined from the database includes that: in response to that the at least two performance values correspond to different interval time in the database, the interval time corresponding to a lowest average performance value is set as the interval time corresponding to the current performance value. Continuing with the above example, if the interval time corresponding to 29(*a*) is 1 second, the average performance value corresponding to 29(*a*) is 28, the interval time corresponding to 29(*b*) is 2 seconds, the average performance value corresponding to 29(*b*) is 30, and the interval time corresponding to 31 is 3 seconds, the average performance value corresponding to 31 is 32, and 28<30<32, then the interval time (1 second) with the lowest average performance value is determined as the interval time corresponding to the current performance value.

In some implementations, the method may further include that: the preset time is adjusted according to the interval time corresponding to the current performance value. For example, if the interval time corresponding to the current performance value is relatively long, the preset time may be correspondingly increased. Of course, in some cases, if the interval time corresponding to the current performance value is relatively long, the preset time may also be correspondingly decreased. The criteria of adjusting the preset time according to the interval time corresponding to the current performance value may be set correspondingly according to specific cases.

It is to be particularly noted that the operations in each embodiment of the abovementioned method for determining the interval time for testing of the server may be exchanged, replaced, added, or deleted, so that these rational permutation and combination transformations for the method for determining the interval time for testing of the server should also belong to the scope of protection of the present disclosure, and the scope of protection of the present disclosure should not be limited to the embodiments.

A second aspect of the embodiments of the present disclosure, as shown in FIG. 3, provides a system for determining interval time for testing of a server, which includes: an acquisition module, configured to acquire network data according to performance influencing key words for servers, analyze the network data to determine one or more influencing factors of the servers, and determine a weight corresponding to a respective one of the one or more influencing factors; a test module, configured to evenly divide multiple servers into multiple groups of servers, and perform multiple rounds of testing on each group of servers, wherein different numbers of tasks are allocated to different groups of servers, and interval time of a respective round of the multiple rounds of testing is successively increased; a calculation module, configured to calculate performance values of each group of servers in each round of testing according to the weight corresponding to the respective one of the one or more influencing factors, and package and write the performance values and the interval time corresponding to the performance values in a database; and an execution module, configured to collect, at every other preset time, the current values corresponding to the one or more influencing factors in an actual running process of a server, calculate a current performance value of the server based on the one or more current values and the weight corresponding to the respective one of the one or more influencing factors, and determine, from the database, interval time corresponding to the current performance value so as to test the server based on the determined interval time.

In some implementations, the calculation module is configured to calculate an average performance value of each group of servers in each round of testing, and package the average performance value and the performance values together.

In some implementations, the execution module is configured to: judge whether there is a unique performance value that has a minimum absolute value of a difference value relative to the current performance value in the database; and in response to that there is a unique performance value that has the minimum absolute value of the difference value relative to the current performance value in the database, set the interval time corresponding to the unique performance value as the interval time corresponding to the current performance value.

In some implementations, the execution module is configured to: in response to that there are at least two performance values that have the minimum absolute value of the difference value relative to the current performance value in the database, judge whether the at least two performance values correspond to the same interval time in the database; and in response to that the at least two performance values correspond to the same interval time in the database, set the interval time as the interval time corresponding to the current performance value.

In some implementations, the execution module is configured to: in response to that the at least two performance values correspond to different interval time in the database, set an average value of the different interval time corresponding to the at least two performance values as the interval time corresponding to the current performance value.

In some implementations, the execution module is configured to: in response to that the at least two performance values correspond to different interval time in the database, set the interval time corresponding to a lowest average performance value as the interval time corresponding to the current performance value.

In some implementations, the system may further include an adjustment module, configured to adjust the preset time according to the interval time corresponding to the current performance value.

Figure 2:
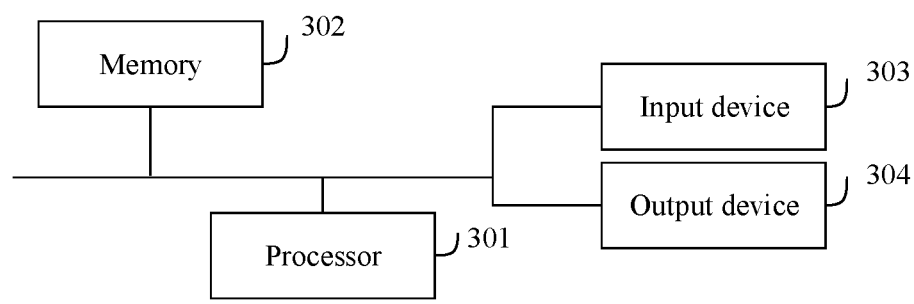
FIG. 2 illustrates a schematic diagram of a hardware structure of a computer device for determining interval time for testing of a server provided in some embodiments the present disclosure.

A third aspect of the embodiments of the present disclosure provides a computer device, as shown in FIG. 2, including: at least one processor and a memory. The memory stores computer instructions capable of running on the processor. The instructions are executed by the processor to implement the following operations: S1, network data is acquired according to performance influencing key words for servers, the network data is analyzed to determine one or more influencing factors of the servers, and a weight corresponding to a respective one of the one or more influencing factors is determined; S2, multiple servers are evenly divided into multiple groups of servers, and multiple rounds of testing are performed on each group of servers, wherein different numbers of tasks are allocated to different groups of servers, and interval time of a respective round of the multiple rounds of testing is successively increased; S3, performance values of each group of servers in each round of testing are calculated according to the weight corresponding to the respective one of the one or more influencing factors, and the performance values and the interval time corresponding to the performance values are packaged and written in a database; and S4, one or more current values respectively corresponding to the one or more influencing factors are collected at every other preset time in an actual running process of a server, the current performance value of the server is calculated based on the one or more current values and the weight corresponding to the respective one of the one or more influencing factors, and the interval time corresponding to the current performance value is determined from the database.

In some implementations, the operation that the performance values and the interval time corresponding to the performance values are packaged and written in the database includes that: an average performance value of each group of servers in each round of testing is calculated, and the average performance value and the performance values are packaged together.

In some implementations, the operation that the interval time corresponding to the current performance value is determined from the database includes that: whether there is a unique performance value that has a minimum absolute value of a difference value relative to the current performance value in the database is judged; and in response to that there is a unique performance value that has the minimum absolute value of the difference value relative to the current performance value in the database, the interval time corresponding to the unique performance value is set as the interval time corresponding to the current performance value.

In some implementations, the operation that the interval time corresponding to the current performance value is determined from the database includes that: in response to that there are at least two performance values that have the minimum absolute value of the difference value relative to the current performance value in the database, whether the at least two performance values correspond to the same interval time in the database is judged; and in response to that the at least two performance values correspond to the same interval time in the database, the interval time is set as the interval time corresponding to the current performance value.

In some implementations, the operation that the interval time corresponding to the current performance value is determined from the database includes that: in response to that the at least two performance values correspond to different interval time in the database, an average value of the different interval time corresponding to the at least two performance values is set as the interval time corresponding to the current performance value.

In some implementations, the operation that the interval time corresponding to the current performance value is determined from the database includes that: in response to that the at least two performance values correspond to different interval time in the database, the interval time corresponding to a lowest average performance value is set as the interval time corresponding to the current performance value.

In some implementations, the method may further include the following operations that the preset time is adjusted according to the interval time corresponding to the current performance value.

FIG. 2 illustrates a schematic diagram of a hardware structure of the computer device for determining interval time for testing of a server provided in some embodiments of the present disclosure.

Taking an apparatus as shown in FIG. 2 as an example, the apparatus includes a processor 301 and a memory 302, and may further include an input device 303 and an output device 304.

The processor 301, the memory 302, the input device 303, and the output device 304 may be connected by a bus or other means, as exemplified by a bus connection in FIG. 2.

The memory 302, as a non-volatile computer-readable storage medium, may be configured to store non-volatile software programs, non-volatile computer-executable programs, and modules, for example, program instructions/modules corresponding to the method for determining the interval time for testing of the server in the embodiments of this application. The processor 301 executes non-volatile software programs, instructions, and modules stored in the memory 302 to execute various functional applications of the servers and data processing by, that is, to implement the method for determining the interval time for testing of the server in the abovementioned method embodiments.

The memory 302 may include a program storage area and a data storage area. The program storage area may store an operating system and an application required for at least one function; and the data storage area may store data created according to u sage of the method for determining the interval time for testing of the server, and the like. In addition, the memory 302 may include a high-speed Random Access Memory (RAM), and may further include a non-volatile memory such as a disk storage device, a flash device, or other non-volatile solid storage devices. In some embodiments, the memory 302 optionally includes memories remotely located relative to the processor 301. These remote memories may be connected to local module through a network. The examples of the abovementioned network include, but are not limited to, the Internet, the Intranet, a local area network, a mobile communication network, and combinations thereof.

The input device 303 may receive information such as an input username and a password. The output device 304 may include a display device such as a display screen.

One or more program instructions/modules corresponding to the method for determining the interval time for testing of the server are stored in the memory 302 to execute the method for determining the interval time for testing of the server in any of the abovementioned method embodiments when being executed by the processor 301.

Any embodiment of the computer device for performing the method for determining the interval time for testing of the server may achieve the same or similar effects as any foregoing method embodiment corresponding thereto.

The present disclosure provides a computer-readable storage medium. As shown in FIG. 4, the computer-readable storage medium stores a computer program that performs the abovementioned method when being executed by a processor.

It is finally to be noted that, those having ordinary skill in the art may understand that all or part of the processes in the abovementioned method embodiments may be implemented by a computer program to instruct related hardware, and the program of the method for determining the interval time for testing of the server may be stored in a computer-readable storage medium. When the program is executed, the flow of the embodiments of various methods as described above may be included. The storage medium for the program may be a disk, an optical disk, a Read Only Memory (ROM), or a RAM. The abovementioned embodiment of the computer program may achieve the same or similar effects as any foregoing method embodiment corresponding thereto.

The above are exemplary embodiments of the present disclosure, but it should be noted that various changes and modifications may be made without departing from the scope disclosed in the embodiments of the present disclosure as defined in the claims. The functions, operations and/or actions of the method claims in accordance with the disclosed embodiments described herein need not be performed in any particular order. In addition, although elements disclosed in the embodiments of the present disclosure may be described or claimed in the singular, unless explicitly limited to the singular, the plural may also be construed.

It is to be understood that, as used herein, the singular form "a" is intended to include the plural form as well, unless the context clearly supports an exception. It is also be understood that the term "and/or" as used herein is meant to include any and all possible combinations of one or more of the associated listed items.

The serial numbers of the foregoing embodiments of the present disclosure are merely for description, and do not represent the superiority or inferiority of the embodiments.

Those having ordinary skill in the art may understand that all or part of the operations in the above embodiments may be completed by means of hardware, or may be completed by instructing the related hardware through a program. The program may be stored in a computer-readable storage medium, and the foregoing storage medium may be an ROM, a magnetic disk, or an optical disk.

Those having ordinary skill in the art should understand that the discussion of any of the above embodiments is merely exemplary, and is not intended to imply that the scope (including the claims) disclosed in the embodiments of the present disclosure is limited to these examples. Under the idea of the embodiments of the present disclosure, the technical features in the above embodiments or different embodiments may also be combined. In addition, there are many other changes in various aspects of the above embodiments of the present disclosure, which are not provided in detail for the sake of brevity. Therefore, any omissions, modifications, equivalent replacements, improvements and the like made within the spirit and principle of the embodiments of the present disclosure shall all fall within the protection scope of the embodiments of the present disclosure.

What is claimed is:

1. A method for determining interval time for testing of a server, comprising:
   acquiring network data according to performance influencing key words for servers, analyzing the network data to determine one or more influencing factors of the servers, and determining a weight corresponding to a respective one of the one or more influencing factors;
   evenly dividing multiple servers into multiple groups of servers, and performing multiple rounds of testing on each group of servers, wherein different numbers of tasks are allocated to different groups of servers, and interval time of a respective round of the multiple rounds of testing is successively increased;
   calculating performance values of each group of servers in each round of testing according to the weight corresponding to the respective one of the one or more influencing factors, and packaging and writing the performance values and the interval time corresponding to the performance values in a database; and
   collecting, at every other preset time, one or more current values respectively corresponding to the one or more influencing factors in an actual running process of a server, calculating a current performance value of the server based on the one or more current values and the weight corresponding to the respective one of the one or more influencing factors, and determining, from the database, interval time corresponding to the current performance value so as to test the server based on the determined interval time.

2. The method according to claim 1, wherein packaging and writing the performance values and the interval time corresponding to the performance values in the database comprises:
   calculating an average performance value of each group of servers in each round of testing, and packaging the average performance value and the performance values together.

3. The method according to claim 1, wherein determining, from the database, the interval time corresponding to the current performance value comprises:
   judging whether there is a unique performance value that has a minimum absolute value of a difference value relative to the current performance value in the database; and
   in response to that there is a unique performance value that has the minimum absolute value of the difference value relative to the current performance value in the database, setting the interval time corresponding to the unique performance value as the interval time corresponding to the current performance value.

4. The method according to claim 3, wherein determining, from the database, the interval time corresponding to the current performance value comprises:
   in response to that there are at least two performance values that have the minimum absolute value of the difference value relative to the current performance value in the database, judging whether the at least two performance values correspond to the same interval time in the database; and
   in response to that the at least two performance values correspond to the same interval time in the database, setting the interval time as the interval time corresponding to the current performance value.

5. The method according to claim 4, wherein determining, from the database, the interval time corresponding to the current performance value comprises:
   in response to that the at least two performance values correspond to different interval times in the database, setting an average value of the different interval times corresponding to the at least two performance values as the interval time corresponding to the current performance value.

6. The method according to claim 4, wherein determining, from the database, the interval time corresponding to the current performance value comprises:
   in response to that the at least two performance values correspond to different interval times in the database, setting the interval time corresponding to a lowest average performance value as the interval time corresponding to the current performance value.

7. The method according to claim 1, further comprising:
   adjusting the preset time according to the interval time corresponding to the current performance value.

8. The method according to claim 1, wherein acquiring the network data according to the performance influencing key words for servers comprises:
   acquiring the network data by using a web crawler technology according to performance influencing key words for servers.

9. The method according to claim 1, wherein analyzing the network data to determine the one or more influencing factors of the servers comprises:
   analyzing the network data by using big data analysis or data mining to determine the one or more influencing factors of the servers.

10. The method according to claim 1, wherein the one or more key factors influencing the servers comprises: a utilization rate of a Central Processing Unit (CPU), a utilization rate of a memory, the number of services, and a rotating speed of a fan.

11. The method according to claim 10, wherein calculating the performance values of each group of servers in each round of testing according to the weight corresponding to the respective one of the one or more influencing factors comprises:
    calculating the performance values of each group of servers according to the following formula:

$$f_{(x)} = x_1 * w_1 + x_2 * w_2 + \left(\frac{100}{x_f}\right) * \frac{x_{f1} + x_{f2} + \ldots x_{fn}}{n} * w_3 \ldots$$

wherein $x_1$ represents the utilization rate of the CPU, $x_2$ represents the utilization rate of the memory, $[x_{f1}, x_{f2} \ldots]$ represents the rotating speed of the fan, $w_1$ represents the weight of the utilization rate of the CPU, $w_2$ represents the weight of the utilization rate of the memory, and $w_3$ represents the weight of the rotating speed of the fan.

12. The method according to claim 1, wherein performing multiple rounds of testing on each group of servers comprises:
distributing test executing samples to the tasks so that multiple rounds of testing are performed on each group of servers.

13. A computer device, comprising:
at least one processor; and
a memory, wherein the memory stores computer instructions capable of running on the processor; and the instructions, when being executed by the processor, causes the processor to:
acquire network data according to performance influencing key words for servers, analyze the network data to determine one or more influencing factors of the servers, and determine a weight corresponding to a respective one of the one or more influencing factors;
evenly divide multiple servers into multiple groups of servers, and perform multiple rounds of testing on each group of servers, wherein different numbers of tasks are allocated to different groups of servers, and interval time of a respective round of the multiple rounds of testing is successively increased;
calculate performance values of each group of servers in each round of testing according to the weight corresponding to the respective one of the one or more influencing factors, and package and write the performance values and the interval time corresponding to the performance values in a database; and
collect, at every other preset time, one or more current values respectively corresponding to the one or more influencing factors in an actual running process of a server, calculate a current performance value of the server based on the one or more current values and the weight corresponding to the respective one of the one or more influencing factors, and determine, from the database, interval time corresponding to the current performance value so as to test the server based on the determined interval time.

14. The computer device according to claim 13, wherein the processor, when executing the instructions to package and write the performance values and the interval time corresponding to the performance values in the database, is configured to:
calculate an average performance value of each group of servers in each round of testing, and package the average performance value and the performance values together.

15. The computer device according to claim 13, wherein the processor, when executing the instructions to determine, from the database, the interval time corresponding to the current performance value, is configured to:
judge whether there is a unique performance value that has a minimum absolute value of a difference value relative to the current performance value in the database; and
in response to that there is a unique performance value that has the minimum absolute value of the difference value relative to the current performance value in the database, set the interval time corresponding to the unique performance value as the interval time corresponding to the current performance value.

16. The computer device according to claim 15, wherein the processor, when executing the instructions to determine, from the database, the interval time corresponding to the current performance value, is configured to:
in response to that there are at least two performance values that have the minimum absolute value of the difference value relative to the current performance value in the database, judge whether the at least two performance values correspond to the same interval time in the database; and
in response to that the at least two performance values correspond to the same interval time in the database, set the interval time as the interval time corresponding to the current performance value.

17. The computer device according to claim 16, wherein the processor, when executing the instructions to determine, from the database, the interval time corresponding to the current performance value, is configured to:
in response to that the at least two performance values correspond to different interval times in the database, set an average value of the different interval times corresponding to the at least two performance values as the interval time corresponding to the current performance value.

18. The computer device according to claim 16, wherein the processor, when executing the instructions to determine, from the database, the interval time corresponding to the current performance value, is configured to:
in response to that the at least two performance values correspond to different interval times in the database, set the interval time corresponding to a lowest average performance value as the interval time corresponding to the current performance value.

19. The computer device according to claim 13, wherein the instructions, when being executed by the processor, causes the processor to:
adjust the preset time according to the interval time corresponding to the current performance value.

20. A non-transitory computer-readable storage medium, storing a computer program, wherein the computer program, when being executed by a processor, causes the processor to:
acquire network data according to performance influencing key words for servers, analyze the network data to determine one or more influencing factors of the servers, and determine a weight corresponding to a respective one of the one or more influencing factors;
evenly divide multiple servers into multiple groups of servers, and perform multiple rounds of testing on each group of servers, wherein different numbers of tasks are allocated to different groups of servers, and interval time of a respective round of the multiple rounds of testing is successively increased;
calculate performance values of each group of servers in each round of testing according to the weight corresponding to the respective one of the one or more influencing factors, and package and write the performance values and the interval time corresponding to the performance values in a database; and
collect, at every other preset time, one or more current values respectively corresponding to the one or more influencing factors in an actual running process of a server, calculate a current performance value of the server based on the one or more current values and the weight corresponding to the respective one of the one or more influencing factors, and determine, from the database, interval time corresponding to the current performance value so as to test the server based on the determined interval time.

* * * * *